US007382902B2

(12) United States Patent
Tisse et al.

(10) Patent No.: US 7,382,902 B2
(45) Date of Patent: Jun. 3, 2008

(54) EVALUATION OF THE DEFINITION OF AN EYE IRIS IMAGE

(75) Inventors: Christel-Loïc Tisse, Plan de Cuques (FR); Laurent Plaza, Fuveau (FR); Guillaume Petitjean, Trets (FR)

(73) Assignee: STMicroelectronics S.A., Montrouge (FR)

( * ) Notice: Subject to any disclaimer, the term of this patent is extended or adjusted under 35 U.S.C. 154(b) by 807 days.

(21) Appl. No.: 10/717,804

(22) Filed: Nov. 20, 2003

(65) Prior Publication Data

US 2004/0101170 A1     May 27, 2004

(30) Foreign Application Priority Data

Nov. 20, 2002   (FR) .................................. 02 14546

(51) Int. Cl.
    G06K 9/00           (2006.01)
(52) U.S. Cl. .................................................... 382/117
(58) Field of Classification Search ..................... None
     See application file for complete search history.

(56) References Cited

U.S. PATENT DOCUMENTS

| 5,040,228 A | 8/1991 | Bose et al. |
| 5,953,440 A | 9/1999 | Zhang et al. |
| 5,978,494 A * | 11/1999 | Zhang ......................... 382/117 |
| 6,307,954 B1 * | 10/2001 | Suzaki ......................... 382/117 |

OTHER PUBLICATIONS

French Search Report from French Patent Application 02/14546, filed Nov. 20, 2002.
Chen Yong-Shen et al. "Video-Based Realtime Eye Tracking Technique For Autostereoscopic Displays" Proceedings Of The Conference On Artificial Intelligence And Applications, Nov. 2000, pp. 188-193.
Behn B., et al. "Ain't Gonna Micky Mouse 'Round No More" Carnegie Melon Unversity, Department of Electrical And Computer Engineering, Final Class Report, Jun. 2000, pp. 1-23.
Choi K-S et al. "New Autofocusing Technique Using The Frequency Selective Weighted Median Filter For Video Cameras" IEEE Transactions On Consumer Electronics, IEEE Inc., New York, US, vol. 45, No. 3, Aug. 1999, pp. 820-827.

* cited by examiner

*Primary Examiner*—Matthew C. Bella
*Assistant Examiner*—Alex Liew
(74) *Attorney, Agent, or Firm*—Lisa K. Jorgenson; James H. Morris; Wolf, Greenfield & Sacks, P.C.

(57) ABSTRACT

A method and a system for evaluating the definition of the image of an eye iris or the like, including approximately localizing the pupil in the image, defining, from the approximate position of the pupil, an examination window centered on this position, and applying a gradient accumulation operation to the luminance values of the pixels of the examination window, the running total being proportional to the definition score of the image.

47 Claims, 2 Drawing Sheets

EVALUATION OF THE DEFINITION OF AN EYE IRIS IMAGE

BACKGROUND OF THE INVENTION

1. Field of the Invention

The present invention relates to the field of digital image processing and, more specifically, to methods of identification or authentication based on digital images of an eye.

2. Discussion of the Related Art

Iris recognition is a well tested biometric identification technique, provided that the image on which the analysis and identification methods are applied is an exploitable image. In particular, the performance of recognition algorithms strongly depends on the definition of the image of the iris to be identified.

Currently, in most applications, and especially in on-board applications (for example for an access control of a telephone or a laptop computer, for an electronic key, etc.), the used camera (digital sensor and lens) does not have an autofocus system adjusting the (real or simulated) focal distance according to the distance.

Further, for obtaining a good resolution of the iris which only takes up a small surface area of the eye, the images are taken at a relatively short distance (generally on the order of from 10 to 30 cm). This results in a small field depth (distance range between the camera and the eye in which the image is clear). This small field depth added to the fact that the eye is spherical may even generate definition differences between areas of a same eye image.

A processing previous to the actual iris recognition thus consists of selecting a sufficiently clear image.

Generally, the shooting device takes a number of images ranging between 5 and 50 and a pre-processing system selects the image to be submitted to the actual recognition algorithm.

The definition evaluation amounts to assigning, to each image, a score characteristic of its definition. This enables either selecting a sufficiently clear image with respect to a determined threshold, or selecting the clearest image among the images of a set. By convention, the higher the score assigned to an image, the clearer the image.

Various techniques for evaluating the definition of digital images have already been provided, be it based on a filtering, a wavelet transformation (WO-A-00/36551), or a frequency analysis (WO-A-00/30525).

All these techniques have the common disadvantage of being slow, especially if they are implemented in miniaturized products where the processing capacity is limited (electronic key, for example). "Slow" means that they are poorly compatible with a real time processing of images taken at a rate greater than 10 images per second. The need for rapidity is, in on-board applications, linked to the need for identification or authentication rapidity of a user by its iris, where the selection of a clear image thereof is a previous step.

Another disadvantage is the complexity in terms of size of the program necessary to execute the definition evaluation algorithm.

Another problem is, to save time and complexity of the method, to limit the area to be examined in definition. In particular, the small field depth in addition to the fact that the eye is spherical and that elements such as eyelashes may be included in the image makes this area localization important to evaluate the definition of the iris and not that of other image areas.

Another problem which is posed for the definition determination of iris images, or more generally of a specific area of an image taken with a small field depth and acquired at small distance, is linked to the presence of areas external to the area to be evaluated (for example, eyelashes), which may be clear while the iris is not. This problem is especially present in operators or algorithms taking into account luminosity gradients, which amounts to taking more account of the contours than of the actual areas. In particular, this is a disadvantage of a conventional operator or algorithm known as an FSWM operator which is besides known as an operator providing acceptable results.

Another problem which is also posed for the definition evaluation of image areas taken at small distance and with a small field depth is linked to the necessary illumination of the taken subject. For eye image sensors, it generally is a light-emitting diode. This light source creates specular spots which pollute the definition evaluation. In particular, the FSWN operator mentioned hereabove may be deceived by the presence of specular spots which tend to mask luminosity gradients originating from the iris with more significant gradients originating from the spots.

SUMMARY OF THE INVENTION

The present invention aims at providing a digital image processing method and system which overcomes one or several of the disadvantages of known methods.

The present invention more specifically relates to the preprocessing applied to images of the same eye to determine a score characteristic of the definition of each image and, according to a preferred aspect, select that of these images which is the clearest.

More specifically, the present invention aims at evaluating the definition of an iris of an eye or the like.

The present invention also aims at selecting, from among a set of eye images or the like, that which is the clearest.

The present invention also aims at providing a simplified method of localization of an iris or the like in a digital eye image which is simple and consumes few calculation resources.

The present invention independently aims at enabling approximate localization of a pupil or the like in a digital image in a simple, fast fashion, consuming few calculation resources.

The present invention independently aims at determining a score characteristic of the definition of a digital image area comprising specular spots.

The present invention also aims at making a luminosity gradient analysis operator insensitive to the presence of parasitic contours in the area having its definition evaluated.

To achieve these and other objects, the present invention provides a method for selecting an eye image from a set of digital images based on its definition, comprising, for each image in the set:

calculating a first approximate characteristic definition score based on a cumulating of the gradients in a single direction of the light intensities of the image pixels;

selecting a subset of images for which said first score is greater than a predetermined threshold; and for each of the images of said subset, calculating a second score characteristic of the image definition by an evaluation method comprising the successive steps of:

approximately localizing the pupil in the image;

defining, from the approximate position of the pupil, an examination window centered on this position; and applying a gradient cumulating operation to the luminance values of the pixels of the examination window, the running total being proportional to the definition score of the image.

According to an embodiment of the present invention, the examination window has an elongated shape, preferably, rectangular.

According to an embodiment of the present invention, the smallest dimension of said examination window approximately corresponds to the average diameter expected for the pupil.

According to an embodiment of the present invention, the largest dimension of said examination window approximately corresponds to the average diameter expected for the iris.

According to an embodiment of the present invention, the approximate localization comprises:

dividing the image into blocks of identical dimensions, the size of which is chosen according to the approximate expected size of the pupil to be localized;

calculating, for each block, the average luminance; and searching that of the blocks having the smallest luminance, the approximate position of the pupil in the image corresponding to the position of the block of minimum luminance.

According to an embodiment of the present invention, the blocks overlap, the pitch in both directions between two neighboring blocks ranging between one tenth and three quarters of the size of a block.

According to an embodiment of the present invention, the division is performed on a sub-sampled image of the digital image, the pitch between two neighboring blocks depending on the image sub-sampling ratio.

According to an embodiment of the present invention, the localization is applied to a digital image reduced in size with respect to the original image, by eliminating two lateral strips of predetermined width.

According to an embodiment of the present invention, said operator cumulates the quadratic norm of horizontal and vertical gradients of luminance values of image pixels, the pixels being selected at least according to a first maximum luminance threshold of other pixels in the involved direction.

According to an embodiment of the present invention, said score is obtained by dividing the running total by the number of cumulated quadratic norms.

According to an embodiment of the present invention, a current pixel having a vertical or horizontal gradient to be taken into account in the running total is selected only if the luminances of two pixels surrounding the current pixel while being distant therefrom by a predetermined interval in the involved vertical or horizontal direction are smaller than said first luminance threshold, said first threshold being selected according to the expected luminosity of possible specular spots which are desired not to be taken into account, and said interval being selected according to the expected size of the possible specular spots.

According to an embodiment of the present invention, the quadratic norm of a gradient is taken into account in the running total only if its value is smaller than a predetermined gradient threshold, selected according to the image contrast.

According to an embodiment of the present invention, a current pixel is selected to be taken into account in the running total only if its luminance is smaller than a second luminance threshold, chosen to be greater than the expected light intensity of the iris in the image.

According to an embodiment of the present invention, the second score assigned to each image is used to select the clearest image from said set.

The present invention also provides a digital image processing system.

The foregoing objects, features, and advantages of the present invention will be discussed in detail in the following non-limiting description of specific embodiments in connection with the accompanying drawings.

DETAILED DESCRIPTION

For clarity, only those elements and those steps that are necessary to the understanding of the present invention have been shown in the drawings and will be described hereafter. In particular, the structure of an iris recognition system has not been described in detail. The present invention is implementable using a conventional system, provided that said system can be programmed to implement the present invention.

The present invention will be described hereafter in relation with the selection of the clearest iris image among a set of images. However, the present invention more generally applies to the determination of the definition of digital images or image portions exhibiting the same characteristics as an iris image and, especially, of images in which a first plane, the definition of which is desired to be determined, is at a different distance from a background. Further, although the present invention is described in relation with a complete example of a definition determination method, some phases of this method may be implemented separately and are, alone, characteristic.

Figure 1:
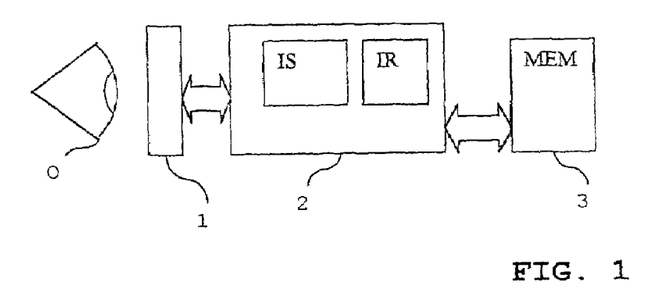
FIG. 1 very schematically shows in the form of blocks an example of an iris recognition system to which the present invention applies.

FIG. 1 very schematically shows an example of an iris recognition system that can implement the selection method according to the present invention.

Such a system is intended to exploit eye images to perform an identification or authentication by indian recognition. For example, a digital sensor 1 takes a set of images of an eye O of a subject. The number of images taken is generally of at least some ten images to enable performing the identification, after selection of the clearest image, while reducing the risk of having to ask the subject to submit himself to a new series of shootings. As an alternative, the images to be analyzed originate from a distant source and may be pre-recorded.

Sensor 1 is connected to a CPU 2 having the function, in particular, of implementing the actual iris recognition (block IR) after having selected (block IS), from among the set of images stored in a memory 3, the clearest image IN to be submitted to the recognition method. The selection method is based on the determination, for each image in the set, of a score characteristic of its definition. This determination is, according to the present invention, performed by means of the method of which a preferred embodiment will be described in relation with FIG. 2. CPU 2 is also used to control all the system components and, in particular, sensor 1 and memory 3.

Figure 2:
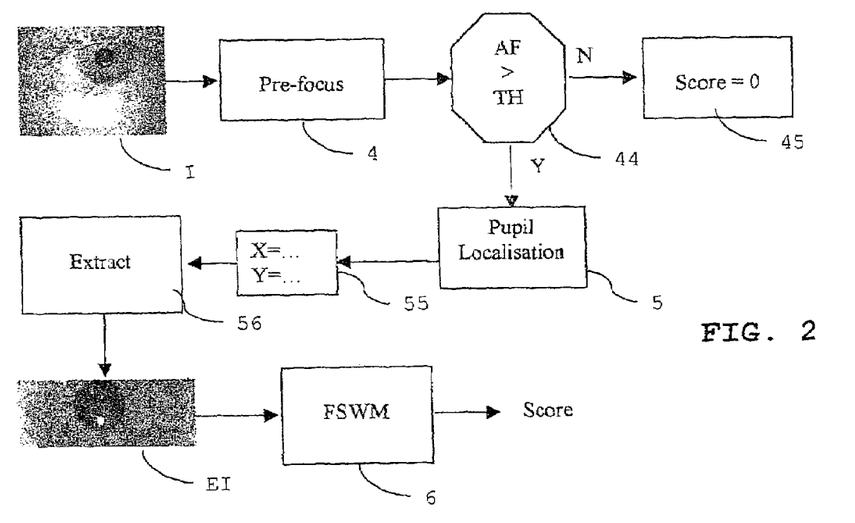
FIG. 2 illustrates, in the form of blocks, an embodiment of the method for determining the score characteristic of the definition of an iris image according to the present invention.

FIG. 2 schematically illustrates in the form of blocks a preferred embodiment of the definition determination method according to the present invention.

The method of FIG. 2 comprises three separate characteristic steps which will be described successively in relation with the processing of an image of the set to be evaluated, knowing that all images in the set are processed, preferably successively, by this method. The selection of the image to which the highest score has been assigned is performed, for example, by simple comparison of the assigned definition scores, by means of a maximum score search step, conventional per se.

A first preprocessing phase (block 4, Pre-focus) aims at eliminating very blurred images (more specifically, of assigning a zero definition score) which will obviously be inappropriate for the iris recognition. According to the present invention, this phase searches large luminance gradients in the horizontal direction (arbitrarily corresponding to the general direction of the eyelids). Such gradients are linked to the presence of eyelashes, of abrupt grey level transitions between the pupil and the iris, between the iris and the white of the eye, between the white of the eye and the eyelid corner, etc. The more abrupt transitions there are, the clearer the image will be. Since a rough preprocessing is here to be made, the gradient search is preferably performed on an approximate image, that is, sub-sampled.

Figure 3:
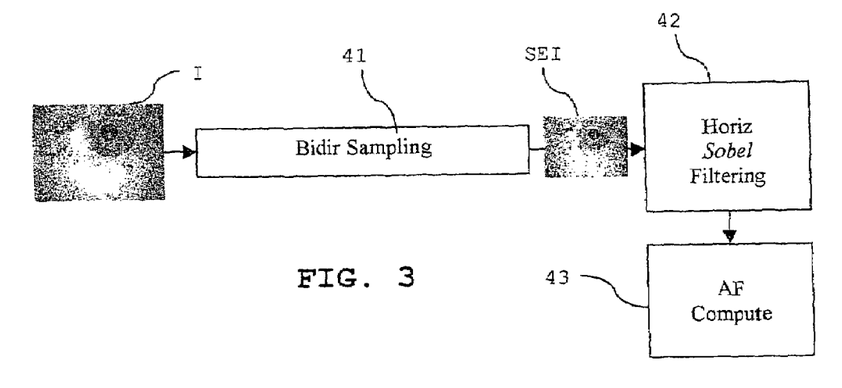
FIG. 3 illustrates, in the form of blocks, an embodiment of the iris localization method according to the present invention.

FIG. 3 schematically illustrates in the form of blocks an embodiment of preprocessing phase 4.

Original image I is first sub-sampled (block 41, Bidir Sampling) in both directions, preferably with a same factor. For example, the sub-sampling ratio is 4 in both directions, which amounts to approximating the image with a factor 16.

Image SEI resulting from step 41 is then submitted to a filtering (block 42, Horiz Sobel Filtering) in a single direction, preferably horizontal to correspond to the direction of the main image lines. The filtering aims at calculating the horizontal gradient at each pixel, and thus of detecting the vertical contours.

For example, it may be a unidirectional filtering known as the "Sobel" filtering. Such a filtering operator is described, for example, in work "Analyse d'images : filtrage et segmentation" by J-P. Cocquerez et S. Phillip, published in 1995 by Masson (ISBN 2-225-84923-4) which is incorporated herein by reference.

The image resulting from the filtering is then submitted to an operator (block 43, AF Compute) for computing the approximate definition score AF. In a simplified manner, this operator only calculates the sum of the intensities of the pixels of the filtered image. The higher the AF score, the clearer the image.

Score AF calculated by block 4 is compared (block 44, FIG. 2, AF>TH) with a predetermined definition threshold TH. If the obtained score is greater than the threshold, the definition determination process carries on with a second iris centering phase which will be described hereafter in relation with FIG. 4. If not, the image is rejected (block 45, Score=0) as not being clear enough.

Second phase 5 (Pupil Localization) comprises locating the eye pupil in the image to center the pupil (and thus the iris) in an image to be analyzed. This localization pursues several aims. A first aim is to subsequently concentrate the definition evaluation on the significant area. A second aim is to avoid for areas of the image with a large gradient (especially eyelashes), which are not in the same plane as the iris, to be taken into account in the definition evaluation, and to then corrupt this evaluation. Several localization methods may be envisaged. For example, a method based on a Hough transform associated with integral and differential operators, described in article "Person identification technique using human iris recognition" by C. Tisse, L. Martin, L. Torres, and M. Robert, published on Calgary Conference VI'02 in May 2002, which is incorporated herein by reference, provides high performance.

However, it has a high resource consumption and its execution time is thus not necessarily compatible with a real time processing. Further, for an evaluation of the definition, only an approximate localization is required.

Figure 4:
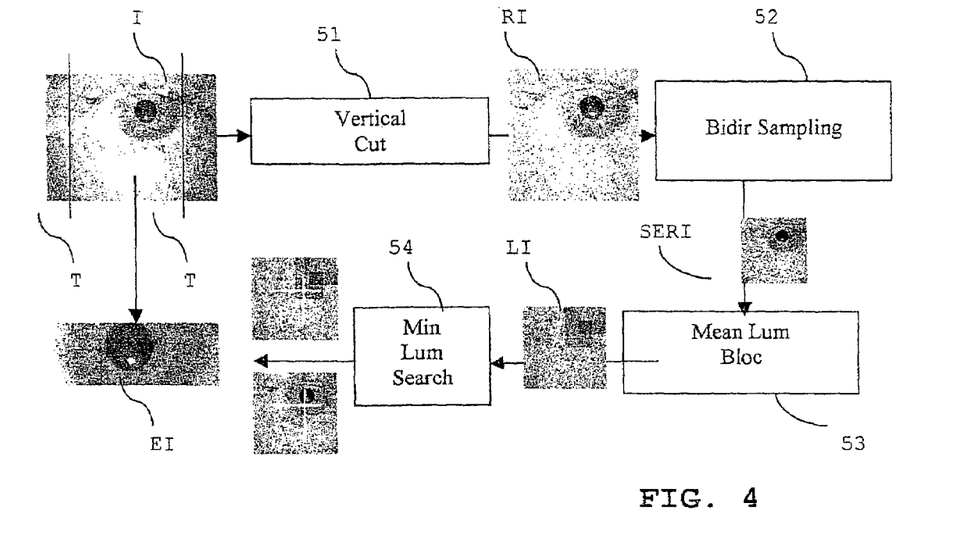
FIG. 4 illustrates, in the form of blocks, an embodiment of the method for calculating the score characteristic of the definition by searching weighted gradients according to the present invention.

FIG. 4 schematically illustrates in the form of blocks a preferred embodiment of the pupil localization phase according to the present invention.

Starting from original image I, lateral strips are first eliminated from this image (block 51, Vertical Cut). This elimination aims at not taking into account, subsequently, the dark edges (delimited by lines T on image I) of the image on its sides. If the eye is properly centered in the image, these strips result from the eye curvature which causes a lesser lighting of the edges. The size (width) of the eliminated strips depends on the resolution and on the size of the original image. Each strip is, for example, of a width ranging between one twentieth and one fifth of the image width.

The obtained reduced image RI is then optionally submitted to a sub-sampling (block 52, Bidir Sampling) in both directions. For example, the sub-sampling is performed with the same ratio as for the preprocessing phase described in relation with FIG. 3.

The average luminance of blocks of the sub-sampled reduced image SERI is then calculated (block 53, Mean Lum Block), the size of a block approximately corresponding to the expected size of the pupil in an evaluated image. This size is perfectly determinable since the processed images are generally taken while respecting a given distance range between the sensor and the eye.

The computation is performed by displacing a computation window with a pitch smaller than the size of a block. The blocks overlap, the pitch in both directions between two neighboring blocks ranging, preferably, between one tenth and three quarters of the size of a block.

For example, for images of 644*484 pixels in which the pupils fit within surfaces between approximately 50*50 pixels and approximately 70*70 pixels, the luminance is calculated for blocks of 15*15 pixels (with a sub-sampling factor of 4 in each direction) by scanning the image with a displacement of the calculation window of from 2 to 5 pixels each time. An image LI of luminance values of the different blocks is then obtained.

In this image, the block having the minimum luminance is searched (block 54, Min Lum Search). This block approximately corresponds to that containing the pupil (or most of the pupil). Indeed, the pupil is the darkest region.

In the case where the sub-sampling is omitted, the number of blocks of which the average luminance must be calculated is higher. The displacement pitch of the calculation window is however reduced (for example, every 8 to 20 pixels).

Once the pupil has been approximately localized by its Cartesian coordinates (X, Y) in the image (block 55, FIG. 2), it is returned to the original image I to extract therefrom (block 56, Extract) an elongated image EI having the shape of a horizontal strip centered on the approximate position of the pupil and of a height corresponding to the average expected diameter of a pupil at the scale of the evaluated images. The fact that the entire iris is not reproduced in this image portion is here not disturbing. Indeed, this is not an analysis of the iris for its recognition but only an evaluation of its definition. This definition will be at least approximately the same over the entire pupil periphery and an analysis in a reduced strip containing the iris on either side of the pupil is enough.

The elongated shape of the selected strip enables taking into account the fact that the eye is often partly closed on a shooting. This then reduces non-relevant contours (eyelashes, eyelids).

Although an elongated rectangular image forming the definition examination window is the preferred embodiment, an oval, or even square or round examination windows can be provided. In the case of a square or round examination window, it will then be ascertained to size it to contain, around the pupil, a sufficient iris area for the definition evaluation. This area will however have to be preferentially deprived of contours such as those of eyelids, for example, by making sure that the eye is wide open in the image shooting.

The assigning of a score characteristic of the definition to the image is then performed, according to the present invention, in a third phase (block 6, FSWM), based on elongated image EI, resulting from the previous step.

According to the present invention, an operator of improved FSWM type is implemented to process the images likely to contain specular spots.

In fact, an FSWM operator calculates, for all the image pixels (here elongated image EI), the sum of the quadratic norm of the horizontal and vertical gradients of luminance value medians. This amounts to applying the following formula:

$$\sum_{i=0,j=0}^{i=n,j=m} (gradV(i,j))^2 + (gradH(i,j))^2,$$

with:

$gradV(i,j)=Med[Lum(i,j),Lum(i+1,j),Lum(i+2,j)]-Med[Lum(i,j),Lum(i-1,j),Lum(i-2,j)]$, and $gradH(i,j)=Med[Lum(i,j),Lum(i,j+1),Lum(i,j+2)]-Med[Lum(i,j),Lum(i,j-1),Lum(i,j-2)]$, where Lum(i,j) represents the light intensity of the pixel of coordinates (i,j) in image EI of size n*m and where Med designates the median function, that is, the result of which corresponds to the median value of the luminances of the pixels in the set where the function is applied.

An FSWM operator such as described hereabove is discussed, for example, in article "New autofocusing technique using the frequency selective weighted median filter for video cameras" by K. S. Choi, J. S. Lee, and S. J. Ko, published in IEEE Trans. On Consumer Electronics, Vol. 45, No. 3, August 1999, which is incorporated herein by reference.

According to the present invention, the sum is not calculated over all the image pixels, but is limited to some pixels chosen in the following characteristic manner.

For the quadratic norm of a gradient of the median of an image pixel to be taken into account in the sum providing the definition score, the respective light intensities of the pixels at a given predetermined distance from the pixel, the gradients of which are calculated, should, according to the present invention at least be smaller than a first predetermined luminance threshold. This amounts to not taking into account (not accumulating in the summing equation of the FSWM operator) the vertical gradients of the pixels of coordinates (i,j) for which Lum(i,j+k)>SAT1, or Lum(i,j−k)>SAT1, and the horizontal gradients of the pixels for which Lum(i+k,j)>SAT1, or Lum(i−k,j)>SAT1. Number k (for example, between 2 and 10) is selected according to the image resolution to correspond to the average size of the transition between a specular spot and the iris. Threshold SAT1 is chosen to correspond to the level of grey for which the image is considered to be saturated.

The above condition eliminates the pixels belonging to a transition between a possible specular spot present in image EI and the rest of the eye. The pixels bringing non-relevant gradients are thus not taken into account for the determination of the definition score.

Preferably, an additional condition is that the horizontal or vertical gradients must be, in absolute value, smaller than a gradient threshold GTH. In the iris, gradients are relatively small. However, this enables not taking into account gradients especially originating from eyelashes. The determination of threshold GTH depends on the image contrast and must be smaller than the average of the expected gradients for eyelashes.

Preferably, the light intensity of the pixel must be smaller than a second predetermined luminance threshold SAT2. Threshold SAT2 is chosen to be greater than the light intensity expected for the iris, which is generally relatively dark (especially as compared to the white of the eye).

As an alternative, the quadratic norm of the gradients is directly compared with threshold GTH (then chosen accordingly). Performing the test on the gradient before squaring it up however enables saving calculation time for all the eliminated gradients.

The compliance with all the above conditions corresponds to a preferred embodiment which can be expressed as follows in an algorithmic description.

Sc=0, NbPix=0

For all the pixels of recentered elongated image EI scanned, for example, in a line scanning (j from 1 to m, for each i from 1 to n):

If[*Lum(i,j+k)<SAT1* AND *Lum(i,j−k)<SAT1* AND *Lum(i,j)<SAT2* AND |*GradV(i,j)|<GTH*], then
Sc=Sc+(*GradV(i,j)*)2 and *NbPix=NbPix*+1;

If[*Lum(i+k,j)<SAT1* AND *Lum(i−k,j)<SAT1* AND *Lum(i,j)<SAT2* AND |*GradH(i,j)|<GTH*], then
Sc=Sc+(*GradH(i,j)*)2 and *NbPix=NbPix*+1;

next j;
next i.

Once all pixels have been processed, the definition score assigned to the image is computed as being:

Score=*Sc/NbPix*.

This weighting enables making the indexes of the different images subsequently comparable to one another.

Preferably, in the application of the above operator, the vertical and horizontal gradients are, even for conditional tests with respect to threshold GTH, only preferentially calculated if the first three conditions (Lum(i+k,j)<SAT1 AND Lum(i−k,j)<SAT1 AND Lum(i,j)<SAT2) relative to light intensities are verified.

It can thus be seen that many gradients are not taken into account in the sum providing the score, and are not even calculated. An advantage then is a considerable time gain for the determination of the image definition score.

Another advantage is that possible specular spots no longer pollute the image definition evaluation.

More generally, the present invention reduces the number of computations to be performed on the pixels of an image, the definition of which is desired to be determined.

Another advantage of the present invention is that, as compared to an equivalent tool implementing conventional definition calculation methods, the present invention is faster to determine the scores characteristic of the definition of an image set.

Another advantage of the present invention is that, while simplifying and making digital processings applied to the images faster, it is more reliable than known methods as concerns the definition evaluation.

It should be reminded that although the present invention has been described in relation with the selection of an image in which the iris is the clearest among a set of digital images of an eye, it more generally applies to images analogous in form and/or in characteristics. Further, some phases characteristic of the discussed method may find applications without being included in the general process and solve specific problems, likely to arise in other processes.

In particular, the pupil localization in an eye image has specific advantages and enables, alone, solving problems and disadvantages of other localization processes used in other methods and especially in actual identification and authentication methods. Another example of application relates to the detection of eye movements of a person in animated images (gaze tracking). Here again, the rapidity with which the present invention enables approximate localization is compatible with the real time processing of animated images.

Further, the phase of determination of the actual definition score, in that it simplifies a known FSWM operator, may find other applications in methods of analysis of various textures for which similar problems are posed and especially, when very bright reflections are desired not to be taken into account. In such applications, a method for determining the score characteristic of the definition of an image exhibits characteristics independent from the other phases described, as an example of application, in the present description.

Of course, the present invention is likely to have various alterations, modifications, and improvements which will readily occur to those skilled in the art. In particular, its implementation in software fashion by using known tools is within the abilities of those skilled in the art based on the functional indications given hereabove. Further, the thresholds, block sizes, reduction or sub-sampling factors, etc. will be chosen according to the application and to the type of images of which the definition is desired to be determined, and their determination is within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for selecting an eye image from a set of digital images based on its definition, the method comprising:

calculating a first approximate characteristic definition score based on a cumulating of the gradients in a single direction of light intensities of pixels of an image;

selecting a subset of images for which said first score is greater than a predetermined threshold; and for each image of the subset of images, calculating a second characteristic definition score by an evaluation method including:

approximately locating a pupil in the image;

defining, from the approximate location of the pupil, an examination window centered on the approximate location; and applying a gradient accumulation operation to luminance values of pixels of the examination window, an accumulating total being proportional to the second characteristic definition score of the image;

wherein approximately locating a pupil in the image includes:

dividing the image into blocks of identical size, the size is chosen according to an expected approximate size of the pupil to be located;

calculating, for each block, the average luminance; and searching for a block having the smallest luminance, an approximate position of the pupil in the image corresponding to a position of the block having the smallest luminance; and wherein dividing the image includes dividing the image into blocks which overlap one another, and a pitch in two directions between two overlapping blocks ranges between one tenth and three quarters of the size of the blocks.

2. The method of claim 1, wherein the examination window has an elongated shape.

3. The method of claim 2, wherein the smallest dimension of the examination window approximately corresponds to an average diameter expected for the pupil.

4. The method of claim 1, wherein the largest dimension of the examination window approximately corresponds to an average diameter expected for an iris.

5. The method of claim 1, wherein dividing the image into blocks is performed on a sub-sampled image of the digital image, and a pitch between two neighboring blocks is dependent on the image sub-sampling ratio.

6. The method of claim 1, wherein approximately locating a pupil in the image is applied to a digital image reduced in size with respect to the original image, the digital image represents the original image with two lateral strips of predetermined width removed.

7. The method of claim 1, wherein the gradient accumulation operation cumulates a quadratic norm of horizontal and vertical gradients of luminance values of image pixels, the pixels selected at least according to a first maximum luminance threshold of other pixels in the single direction.

8. The method of claim 7, wherein the second characteristic definition score is obtained by dividing a running total by a number of cumulated quadratic norms.

9. The method of claim 7, further including:

selecting a current pixel having a vertical or horizontal gradient to be taken into account in the total only if luminances of two pixels surrounding the current pixel while being distant therefrom by a predetermined interval in one of the vertical or horizontal directions are smaller than the first luminance threshold, the first threshold being selected according to an expected luminosity of possible specular spots which are desired not to be taken into account, and the interval being selected according to an expected size of the possible specular spots.

10. The method of claim 7, wherein the quadratic norm of a gradient is taken into account in the total only if a value of that quadratic norm is smaller than a predetermined gradient threshold, the predetermined gradient threshold being selected according to a contrast of the image.

11. The method of claim 7, wherein a current pixel is selected to be taken into account in the total only if a luminance of the current pixel is smaller than a second luminance threshold, the second luminance threshold being chosen to be greater than an expected light intensity of an iris in the image.

12. The method of claim 1, wherein the second score assigned to each image is used to select the clearest image from said set.

13. The method of claim 2, wherein the examination window has a substantially rectangular shape.

14. A method for selecting an eye image from a set of digital images based on its definition, the method comprising:
calculating a first approximate characteristic definition score based on a cumulating of the gradients in a single direction of light intensities of pixels of an image;
selecting a subset of images for which said first score is greater than a predetermined threshold; and
for each image of the subset of images, calculating a second characteristic definition score by an evaluation method including:
approximately locating a pupil in the image;
defining, from the approximate location of the pupil, an examination window centered on the approximate location; and
applying a gradient accumulation operation to luminance values of pixels of the examination window, an accumulating total being proportional to the second characteristic definition score of the image;
wherein approximately locating a pupil in the image includes:
dividing the image into blocks of identical size, the size is chosen according to an expected approximate size of the pupil to be located;
calculating, for each block, the average luminance; and
searching for a block having the smallest luminance, an approximate position of the pupil in the image corresponding to a position of the block having the smallest luminance; and
wherein dividing the image into blocks is performed on a sub-sampled image of the digital image, and a pitch between two neighboring blocks is dependent on the image sub-sampling ratio.

15. The method of claim 14, wherein the examination window has an elongated shape.

16. The method of claim 15, wherein the smallest dimension of the examination window approximately corresponds to an average diameter expected for the pupil.

17. The method of claim 14, wherein the largest dimension of the examination window approximately corresponds to an average diameter expected for an iris.

18. The method of claim 14, wherein approximately locating a pupil in the image is applied to a digital image reduced in size with respect to the original image, the digital image represents the original image with two lateral strips of predetermined width removed.

19. The method of claim 14, wherein the gradient accumulation operation cumulates a quadratic norm of horizontal and vertical gradients of luminance values of image pixels, the pixels selected at least according to a first maximum luminance threshold of other pixels in the single direction.

20. The method of claim 19, wherein the second characteristic definition score is obtained by dividing a running total by a number of cumulated quadratic norms.

21. The method of claim 19, further including:
selecting a current pixel having a vertical or horizontal gradient to be taken into account in the total only if luminances of two pixels surrounding the current pixel while being distant therefrom by a predetermined interval in one of the vertical or horizontal directions are smaller than the first luminance threshold, the first threshold being selected according to an expected luminosity of possible specular spots which are desired not to be taken into account, and the interval being selected according to an expected size of the possible specular spots.

22. The method of claim 19, wherein the quadratic norm of a gradient is taken into account in the total only if a value of that quadratic norm is smaller than a predetermined gradient threshold, the predetermined gradient threshold being selected according to a contrast of the image.

23. The method of claim 19, wherein a current pixel is selected to be taken into account in the total only if a luminance of the current pixel is smaller than a second luminance threshold, the second luminance threshold being chosen to be greater than an expected light intensity of an iris in the image.

24. The method of claim 14, wherein the second score assigned to each image is used to select the clearest image from said set.

25. The method of claim 15, wherein the examination window has a substantially rectangular shape.

26. A method for selecting an eye image from a set of digital images based on its definition, the method comprising:
calculating a first approximate characteristic definition score based on a cumulating of the gradients in a single direction of light intensities of pixels of an image;
selecting a subset of images for which said first score is greater than a predetermined threshold; and
for each image of the subset of images, calculating a second characteristic definition score by an evaluation method including:
approximately locating a pupil in the image;
defining, from the approximate location of the pupil, an examination window centered on the approximate location; and
applying a gradient accumulation operation to luminance values of pixels of the examination window, an accumulating total being proportional to the second characteristic definition score of the image
wherein approximately locating a pupil in the image includes:
dividing the image into blocks of identical size, the size is chosen according to an expected approximate size of the pupil to be located;
calculating, for each block, the average luminance; and
searching for a block having the smallest luminance, an approximate position of the pupil in the image corresponding to a position of the block having the smallest luminance; and
wherein approximately locating a pupil in the image is applied to a digital image reduced in size with respect to the original image, the digital image represents the original image with two lateral strips of predetermined width removed.

27. The method of claim 26, wherein the examination window has an elongated shape.

28. The method of claim 27, wherein the smallest dimension of the examination window approximately corresponds to an average diameter expected for the pupil.

29. The method of claim 26, wherein the largest dimension of the examination window approximately corresponds to an average diameter expected for an iris.

30. The method of claim 26, wherein the gradient accumulation operation cumulates a quadratic norm of horizontal and vertical gradients of luminance values of image pixels, the pixels selected at least according to a first maximum luminance threshold of other pixels in the single direction.

31. The method of claim 30, wherein the second characteristic definition score is obtained by dividing a running total by a number of cumulated quadratic norms.

32. The method of claim 30, further including:
selecting a current pixel having a vertical or horizontal gradient to be taken into account in the total only if luminances of two pixels surrounding the current pixel while being distant therefrom by a predetermined interval in one of the vertical or horizontal directions are smaller than the first luminance threshold, the first threshold being selected according to an expected luminosity of possible specular spots which are desired not to be taken into account, and the interval being selected according to an expected size of the possible specular spots.

33. The method of claim 30, wherein the quadratic norm of a gradient is taken into account in the total only if a value of that quadratic norm is smaller than a predetermined gradient threshold, the predetermined gradient threshold being selected according to a contrast of the image.

34. The method of claim 30, wherein a current pixel is selected to be taken into account in the total only if a luminance of the current pixel is smaller than a second luminance threshold, the second luminance threshold being chosen to be greater than an expected light intensity of an iris in the image.

35. The method of claim 26, wherein the second score assigned to each image is used to select the clearest image from said set.

36. The method of claim 27, wherein the examination window has a substantially rectangular shape.

37. A method for selecting an eye image from a set of digital images based on its definition, the method comprising:
calculating a first approximate characteristic definition score based on a cumulating of the gradients in a single direction of light intensities of pixels of an image;
selecting a subset of images for which said first score is greater than a predetermined threshold; and
for each image of the subset of images, calculating a second characteristic definition score by an evaluation method including:
approximately locating a pupil in the image;
defining, from the approximate location of the pupil, an examination window centered on the approximate location; and
applying a gradient accumulation operation to luminance values of pixels of the examination window, an accumulating total being proportional to the second characteristic definition score of the image; and
wherein the gradient accumulation operation cumulates a quadratic norm of horizontal and vertical gradients of luminance values of image pixels, the pixels selected at least according to a first maximum luminance threshold of other pixels in the single direction.

38. The method of claim 37, wherein the examination window has an elongated shape.

39. The method of claim 38, wherein the smallest dimension of the examination window approximately corresponds to an average diameter expected for the pupil.

40. The method of claim 37, wherein the largest dimension of the examination window approximately corresponds to an average diameter expected for an iris.

41. The method of claim 37, wherein the second characteristic definition score is obtained by dividing a running total by a number of cumulated quadratic norms.

42. The method of claim 37, wherein approximately locating a pupil in the image includes:
dividing the image into blocks of identical size, the size is chosen according to an expected approximate size of the pupil to be located;
calculating, for each block, the average luminance; and
searching for a block having the smallest luminance, an approximate position of the pupil in the image corresponding to a position of the block having the smallest luminance.

43. The method of claim 37, further including:
selecting a current pixel having a vertical or horizontal gradient to be taken into account in the total only if luminances of two pixels surrounding the current pixel while being distant therefrom by a predetermined interval in one of the vertical or horizontal directions are smaller than the first luminance threshold, the first threshold being selected according to an expected luminosity of possible specular spots which are desired not to be taken into account, and the interval being selected according to an expected size of the possible specular spots.

44. The method of claim 37, wherein the quadratic norm of a gradient is taken into account in the total only if a value of that quadratic norm is smaller than a predetermined gradient threshold, the predetermined gradient threshold being selected according to a contrast of the image.

45. The method of claim 37, wherein a current pixel is selected to be taken into account in the total only if a luminance of the current pixel is smaller than a second luminance threshold, the second luminance threshold being chosen to be greater than an expected light intensity of an iris in the image.

46. The method of claim 37, wherein the second score assigned to each image is used to select the clearest image from said set.

47. The method of claim 38, wherein the examination window has a substantially rectangular shape.

* * * * *

UNITED STATES PATENT AND TRADEMARK OFFICE
CERTIFICATE OF CORRECTION

| | | |
|---|---|---|
| PATENT NO. | : 7,382,902 B2 | |
| APPLICATION NO. | : 10/717804 | |
| DATED | : June 3, 2008 | |
| INVENTOR(S) | : Christel-Loic Tisse et al. | |

It is certified that error appears in the above-identified patent and that said Letters Patent is hereby corrected as shown below:

Col. 4, line 54 should read:
perform an identification or authentication by iridian recog- Signed and Sealed this Nineteenth Day of August, 2008

JON W. DUDAS
*Director of the United States Patent and Trademark Office*